Jan. 16, 1968     D. K. PORTER     3,364,093

TIRE-BUILDING APPARATUS

Filed Aug. 19, 1964     2 Sheets-Sheet 1

INVENTOR.
DONALD K. PORTER
BY Joseph Januszkiewicz
ATTY.

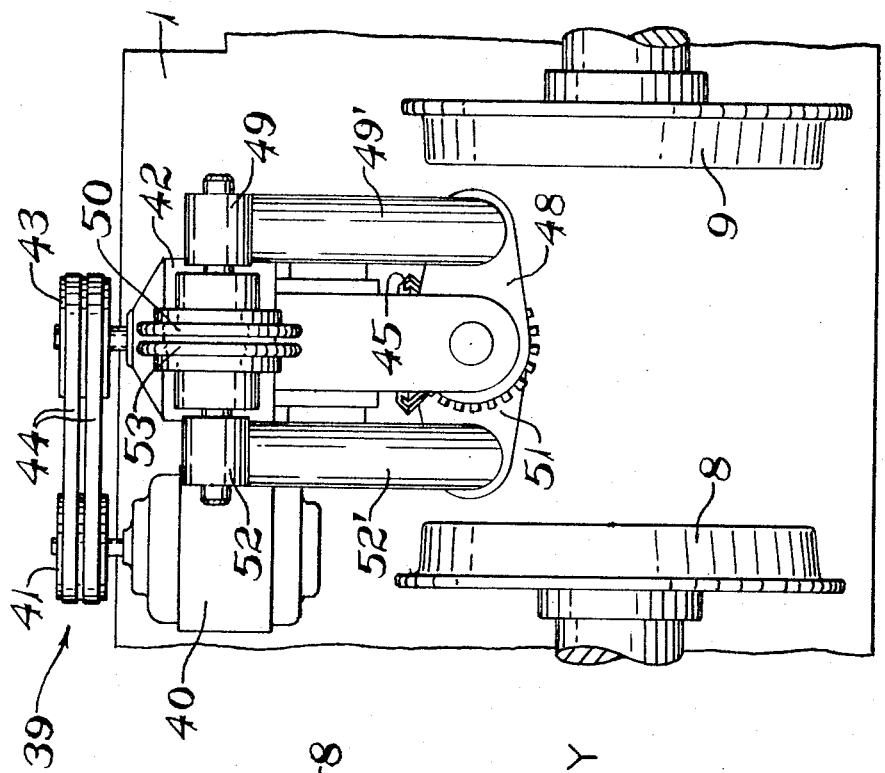
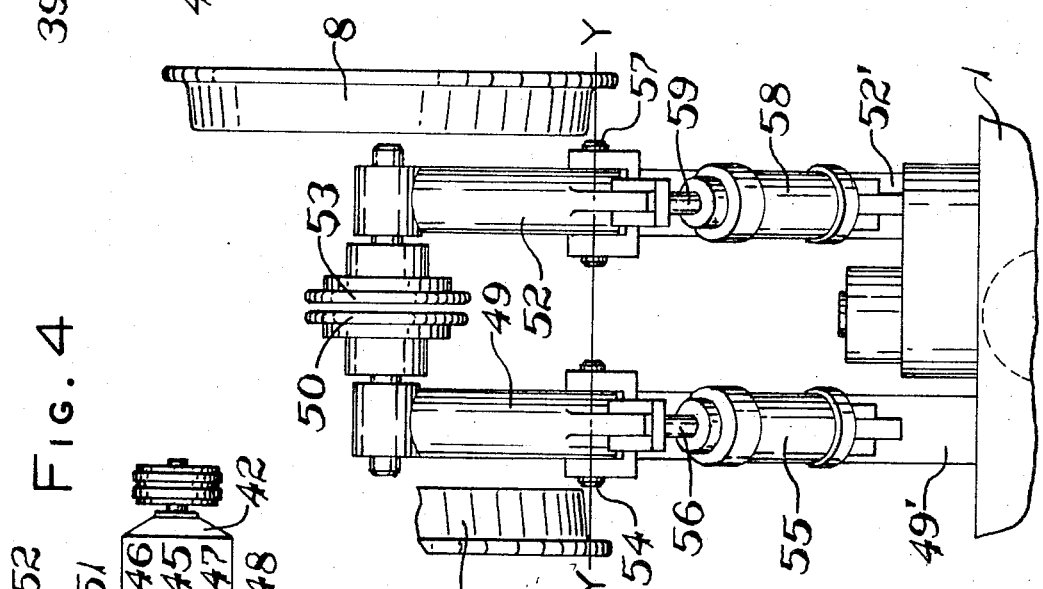
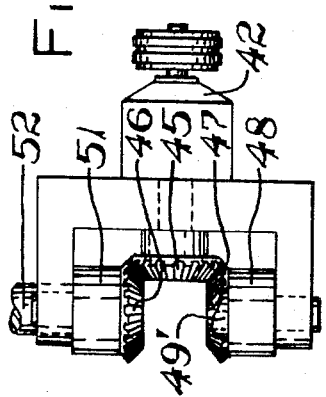

United States Patent Office 3,364,093
Patented Jan. 16, 1968

3,364,093
TIRE-BUILDING APPARATUS
Donald K. Porter, Cuyahoga Falls, Ohio, assignor to The B. F. Goodrich Company, New York, N.Y., a corporation of New York
Filed Aug. 19, 1964, Ser. No. 390,587
5 Claims. (Cl. 156—415)

ABSTRACT OF THE DISCLOSURE

A tire-building apparatus for shaping pneumatic tires which includes a support frame with axially spaced stanchions wherein each stanchion supports a rim flange for mounting one end of a tire carcass with such rim flanges being axially movable and positively driven by axially spaced transmission means interconnected below the movable flanges to facilitate the loading and unloading of a tire carcass thereto.

---

This invention relates generally to the art of tire building and more particularly to new and useful improvements in the machines for building pneumatic tires.

In the manufacture of pneumatic tires of the class known as the zero-angle tires, it is necessary to convert the cylindrical shaped green tire to an annular pre-formed shape to facilitate putting an inextensible overhead band element thereon. One form of tire machine utilized bladders to aid the forming processes; however, it was difficult to remove such formed tires from the machine. The present invention contemplates an improvement thereon by employing a bladderless type of construction wherein a cylindrical shaped tire having been partially built on a conventional profile type drum is transferred to a second machine. The flanges of the second machine are axially movable such that simultaneously as the tire is inflated both flanges are positively moved closer together the same distance until the center portion of the tire is the proper diameter for application of a circumferentially extending restrictive band.

The quality of the finished tire is improved by insuring the positive movement of the flanges the same incremental distance.

In brief, this invention includes a pair of spaced axially movable flanges mounted on shafts journalled in sleeves and movable relative thereto to facilitate the annular shaping of the green tire. Novel means are provided to selectively rotate the flanges or move them axially toward or away from each other whereby the shaped tire is more easily formed to accommodate the receiving of the inextensible band and tread. The tread and band are stitched to the annularly shaped carcass prior to removal from the machine.

An object of this invention is to provide a new and improved tire-building machine which facilitates the building of tires having inextensible bands. A further object of this invention is to provide a tire building machine which is capable of making radial tires of a wide range of sizes. Another object of this invention is to provide a tire-building machine having considerable flexibility in the manufacture of tires in relation to the number of tire sizes and diameter sizes. A further object of this invention is to provide a tire building machine which improves the quality of the tire. A further object is to provide an apparatus for building tires which minimizes the equipment necessary to build tires. These and other objects and advantages of the invention will hereinafter become more fully apparent from the following description of the annexed drawings which show a preferred embodiment and wherein:

FIG. 2 is a plan view of the stitching mechanism showing the flanges of the tire machine assembly.

FIG. 3 is a rear elevational view of the stitching mechanism showing the flanges.

FIG. 4 is a fragmentary view of the mechanism for swinging the stitching mechanism.

Figure 1:
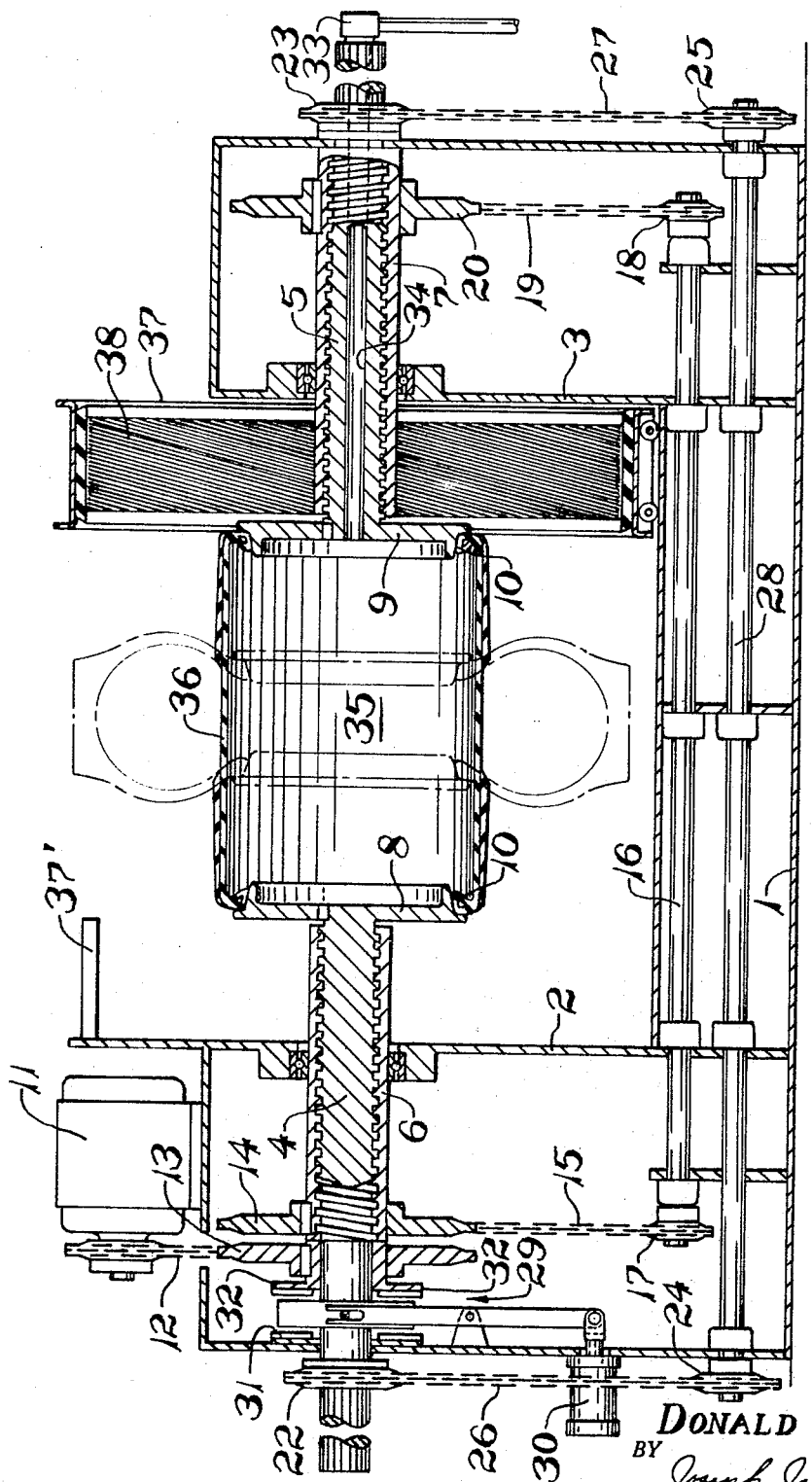
FIG. 1 shows a longitudinal sectional view of the tire-building apparatus.

Referring to the drawings, wherein like reference characters designate like or corresponding parts throughout the several views, there is shown in FIG. 1 a support or base frame 1 which supports a pair of laterally spaced housings 2 and 3. The housings 2 and 3 suitably support for rotation threaded shafts 4 and 5, respectively, which in turn support quills 6 and 7, respectively. The threaded shafts 4 and 5 have their one end portion suitably secured to flanges 8 and 9, respectively, which flanges are recessed as at 10 to provide a seat for the bead of a tire carcass. An O-ring may be provided on the recess to facilitate the sealing between the tire being built and the flange.

The housing 2 supports a motor unit 11 which drives a chain 12 which in turn drives a sprocket 13 that is keyed to the quill 6. Quill 7 is driven in synchronism with the quill 6 through a sprocket 14 keyed to quill 6 via a chain 15 connected to a shaft 16 via sprocket 17 which in turn drives sprocket 18, chain 19 and sprocket 20 keyed to quill 7. The respective outer end portions of shafts 4 and 5 are splined to receive sprockets 22 and 23, respectively, which in turn are connected to sprockets 24 and 25, respectively, via chains 26 and 27. Sprockets 24 and 25 are keyed to a shaft 28 whereby the rotation of the respective shafts 4 and 5 are driven in synchronism.

Jaw clutch 29 is mounted on shaft 4 and operated by a cylinder 30 such that pressurization of the head end of cylinder 30 pivots the jaw clutch 29 leftward as viewed in FIG. 1 to engage a jaw 31 fixed to the housing 2. Pressurization of the rod end of cylinder 30 pivots the jaw clutch 29 rightwardly as viewed in FIG. 1 to engage the jaw 32 secured to quill 6 to thereby lock the rotation of quill 6 to shaft 4. The engagement of jaw clutch 29 with jaw 31 permits relative rotation between quill 6 and shaft 4 upon rotation of quill 6 by motor 11 for a purpose to be described hereinafter. The outer end portion of shaft 5 has a rotary union 33 connected to a source of air pressure by which pressurized air may be directed through a bore 34 in shaft 5 into a chamber 35, which chamber 35 is formed by the spaced flanges 8 and 9 and a tire carcass 36 mounted therebetween. Simultaneously with the pressurization of the chamber 35, flanges 8 and 9 are moved toward each other whereby the tire carcass 36 assumes a toroidal shape for the application of the inextensible overhead and tread as shown in phantom lines in FIG. 1. Suitably journalled on the frame 1 is an annular overhead carrier 37 adapted to support an inextensible overhead 38. The carrier 37 is centered over the tire 36 such that as the tire is being formed, the overhead 38 is positioned onto the tire and thereafter stitched thereto. Housing 2 discloses a projection 37' which is an alternative means for holding an overhead band for application to the expanding tire 36.

The mechanism for stitching the overhead and tread as well as the auxiliary strips onto the preformed green tire comprises a stitching apparatus 39. Stitching apparatus 39 includes a motor 40 mounted on support frame 1 driving a pulley 41. Transmission means 42 mounted on support frame 1 has a pulley 43 which is driven by pulley 41 through a pulley belt 44. The output of transmission means 42 drives a bevel gear 45 (FIG. 4) which in turn drives bevel gears 46 and 47 journalled in suitable support means. Rotation of bevel gear 47 pivots a hub 48 about the axis of bevel gear 47 swinging with hub 48 a support member 49′ and 49. A stitching wheel 50 is suitably journalled on the upper end portion of the support member 49 as shown in FIG. 3. As viewed in FIG. 2, the stitching wheel 50 is swung in a clockwise direction to perform the stitching operation. Rotation of bevel gear 46 rotates a hub 51 about the axis of bevel gear 46 while simultaneously swinging therewith support member 52′ and support member 52. Support member 52 has a stitching wheel 53 rotatably journalled thereon to cooperate with the stitching wheel 50 to perform the stitching operation.

Support members 49 and 52 are mounted on their respective hubs for pivotal movement in a vertical plane about a horizontal axis Y—Y as shown in FIG. 3. Support member 49 is pivotally connected to the elongated support member 49′ as at 54 (FIG. 3). Hydraulic cylinder 55 has its cylinder end connected to the elongated support member 49′ and its rod end 56 pivotally connected to the support member 49. Controlled pressurization of the hydraulic cylinder 55 permits the controlled pivoting of the support member 49 and the stitching wheel 50 about the pivot axis Y—Y. Support member 52 is pivotally connected to the elongated support member 52′ as at 57. The hydraulic cylinder 58 is pivotally connected to the support member 52. In a similar manner, the controlled pivoting of the hydraulic cylinder 58 controls the pivotal movement of support member 52 about the axis Y—Y.

In the operation of the tire apparatus a radial filament tire which has been partially built on a conventional profile type drum is located with its beads on the flanges 8 and 9. Such position is shown by the full lines of the flanges 8 and 9 and tire 36 in FIG. 1. The cylindrical shaped tire 36 is converted to an annular shape by pressurizing the chamber 35 by the admission of the pressurized air thereto via conduit 34 and rotary union 33 from the pressure source. The axial movement of the flanges 8 and 9 support each other and is effected by the pressurization of the head end of hydraulic cylinder 30 whereby the jaw clutch 29 is pivoted rightwardly as viewed in FIG. 1 to engage the jaw clutch 31. Energization of motor 11 operates to rotate quill 6 via its connection to motor 11 whereas shaft 4 is prevented from rotation by its connection to the housing 2 via jaw clutch 29 and clutch 31. Shaft 5 in housing 3 is prevented from rotation by its positive connection to the shaft 4 through sprocket 23, chain 27, sprocket 25, shaft 28, sprocket 24, chain 26 and sprocket 22. Simultaneous rotation of quill 7 is effected with quill 6 by positive connection thereto through sprocket 20, chain 19 sprocket 18, shaft 16, sprocket 17, chain 15, and sprocket 14. Flanges 8 and 9 are moved longitudinally toward each other along the center line until carcass 36 assumes the desired shape to facilitate the centering of the inextensible overhead 38 thereon. The overhead 38 is stitched thereto by the stitching mechanism 39. The head end of the hydraulic cylinders 55 and 58 are pressurized to pivot the support members 49 and 52, respectively, toward the longitudinal center line of the tire carcass 56 until the stitching wheels 50 and 53 are adapted to engage the formed tire.

The rod end of hydraulic cylinder 30 is pressurized to disengage jaw clutch 29 from clutch 31 and engage jaw clutch 29 with jaw clutch 32 whereby shafts 4 and 5 are locked to their respective quills 6 and 7 to assure simultaneous rotation of the flanges 8 and 9.

Sufficient pressure is maintained on the head ends of hydraulic cylinders 55 and 58 to maintain a pressure on the stitching wheels 50 and 53 with respect to the tire carcass to assure stitching. Motor 40 is then energized to rotate the bevel gear 45 through the transmission means 42 and thereby impart rotation to the respective bevel gears 46 and 47. Bevel gears 46 and 47 are rotated in opposite directions thereby imparting a clockwise rotation to support member 49 while a counterclockwise rotation to support member 52 to thereby move the stitching wheels 50 and 53 along with the outer periphery of the tread of tire 36 to firmly stitch the thread thereto. Upon completion of the stitching operation, the rod end of hydraulic cylinders 55 and 58 are pressurized to withdraw the stitching wheels 50 and 53 from the formed tire and such support members 49 and 52 are then swung to their retracted position as shown in FIG. 2 by the reverse rotation of motor 40.

Through the positive drive of the respective flanges 8 and 9, precise linear controlled movement of the flanges is maintained to insure precise control of the tire width and the even distribution of the plies. Such tire apparatus described utilizes a simple mechanism, yet effectively controls the quality of tire manufactured.

Various modifications are contemplated and may obviously be resorted to by those skilled in the art without departing from the spirit and scope of the invention, as hereinafter defined by the appended claims, as only a preferred embodiment thereof has been disclosed.

I claim:

1. A tire-building apparatus comprising a support having a pair of upwardly extending spaced end portions, a flange mounted on each end portion for movement in a longitudinal direction wherein said flanges are adapted to support a tire carcass therebetween, each of said flanges having an annular inwardly extending bead seat for supporting one edge of an annular bead edge of a cylindrical tire carcass, transmission means in said end portions and extending through said support operatively interconnecting said flanges for rotating said flanges simultaneously at the same speed and for selectively simultaneously moving said flanges the same longitudinal distance toward each other and apart.

2. Apparatus for building and shaping tires from a tire band into a toric shape comprising a frame; a pair of spaced support members on said frame each of said support members rotatably supporting one end of a shaft; said shafts being spaced and coaxially aligned, each of said shafts having a disc mounted on the other end thereof for rotation therewith; each of said discs having an annular seat for receiving a circumferential edge portion of a tubular green tire carcass; each of said annular seats facing toward each other to accommodate the annular bead edge of a tire carcass; extending through said frame and said support members for rotating said shafts and said discs in unison; means extending through said frame and support members for moving said discs longitudinally on said shafts in unison to accommodate the inflating of such green tire carcass held between said discs on said annular seats to accommodate the forming of such green tire into a toric shape; and means for pressurizing a chamber defined by said discs and a tire band held thereby on said annular seats to shape such tire band into a toric shape.

3. In an apparatus for building and shaping pneumatic tires comprising a support frame, said frame having a pair of upwardly extending support members; a quill mounted for rotation in each of said support members to thereby provide a pair of spaced quills; each of said quills having a threaded bore; a shaft mounted in each of said bores threadedly engaged therewith, each shaft having a flange carried by one end portion thereof, said flanges being adjacent to each other to provide an unobstructed clearance space therebetween for the loading of a tire carcass therebetween; each of said flanges having an annular recess to define a circumferentially extending bead seat for receiving one bead edge of a tire carcass, said annular recesses facing toward each other to accommodate the mounting of the annular bead edge of a cylindrical tire carcass; one of said shafts having a bore for interconnecting the chamber defined by said flanges and such cylindrical tire carcass held therebetween with a pressure source; transmission means mounted in each of said support members and interconnected through said support frame below said flanges for rotating said quills and said shafts without extending into said clearance space;

and clutch means mounted in one of said support members and operative in one position to interconnect said transmission means to rotate said shafts and said quills in unison and operative in a second position to effect relative rotation between said quills and said shafts to effect movement of said flanges toward or away from each other the same distance.

4. In an apparatus for building and shaping pneumatic tires as set forth in claim 3 wherein said transmission means includes a sprocket keyed to each of said quills and interconnected through said support frame, a sprocket keyed to the splined ends of each of said shafts and interconnected through said support frame, and drive means operatively connected to one of said quills for rotating said quills in unison; and said clutch means selectively operable to rotate said quills and shafts in unison or relative to each other.

5. In an apparatus as set forth in claim 4 wherein said clutch means includes clutch plate operatively connected to one of said quills, a clutch plate operatively connected to one of said support members, a clutch journalled on said shaft for selective movement to a first or second position to effect engagement with either one of said clutch plates.

References Cited

UNITED STATES PATENTS

| | | | |
|---|---|---|---|
| 1,606,695 | 11/1926 | Cole | 156—419 X |
| 2,814,330 | 11/1957 | Vanzo et al. | 156—410 |
| 2,936,023 | 5/1960 | Giletta et al. | 156—410 |
| 3,107,192 | 10/1963 | McNenney | 156—416 |
| 3,127,294 | 3/1964 | Porter | 156—124 X |
| 3,138,510 | 6/1964 | Hindin et al. | 156—123 X |
| 3,184,361 | 5/1965 | Allitt | 156—416 X |

FOREIGN PATENTS 1,240,329  7/1960  France.

EARL M. BERGERT, *Primary Examiner.*

CLIFTON B. COSBY, *Examiner.*

UNITED STATES PATENT OFFICE
CERTIFICATE OF CORRECTION

Patent No. 3,364,093

January 16, 1968

Donald K. Porter

It is certified that error appears in the above identified patent and that said Letters Patent are hereby corrected as shown below:

Column 4, line 44, before "extending" insert -- means --.

Signed and sealed this 17th day of February 1970.

(SEAL)
Attest:

Edward M. Fletcher, Jr.
Attesting Officer

WILLIAM E. SCHUYLER, JR.
Commissioner of Patents